United States Patent
Ross et al.

(10) Patent No.: US 6,621,871 B2
(45) Date of Patent: Sep. 16, 2003

(54) INCREMENTAL REDUNDANCY PACKET COMBINER AND DECODER

(75) Inventors: J. A. Fergus Ross, Del Mar, CA (US); Thomas J. Kenney, San Diego, CA (US); Jean-Marie Tran, San Diego, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/822,985

(22) Filed: Mar. 30, 2001

(65) Prior Publication Data

US 2002/0141514 A1 Oct. 3, 2002

(51) Int. Cl.[7] .................................................. H04L 5/12
(52) U.S. Cl. .................. 375/262; 375/265; 375/341; 375/347; 714/751; 714/754; 714/758; 714/774; 714/776; 714/790; 714/791
(58) Field of Search ................................. 375/262, 265, 375/324, 340, 341, 347; 714/746, 748, 751, 752, 754, 758, 774, 776, 786, 790, 791

(56) References Cited

U.S. PATENT DOCUMENTS

| | | | | |
|---|---|---|---|---|
| 5,406,570 A | * | 4/1995 | Berrou et al. | 375/341 |
| 5,907,583 A | * | 5/1999 | Sakoda et al. | 375/260 |
| 5,954,839 A | * | 9/1999 | Park et al. | 375/364 |
| 6,223,319 B1 | * | 4/2001 | Ross et al. | 714/755 |
| 6,263,467 B1 | * | 7/2001 | Hladik et al. | 714/751 |
| 6,268,767 B1 | * | 7/2001 | Maalej et al. | 329/304 |
| 6,307,901 B1 | * | 10/2001 | Yu et al. | 375/233 |

* cited by examiner

Primary Examiner—Stephen Chin
Assistant Examiner—Dac V. Ha
(74) Attorney, Agent, or Firm—Milan I. Patel

(57) ABSTRACT

Bit probability estimates generated by a turbo decoder are employed to weight the bits of a received packet before combining the received packet with a redundant packet. Bits are individually weighted by the corresponding bit probability estimate and all bits within the received packet are weighted by a block confidence estimate generated from the cumulative bit probability estimates for the received packet. Weighted packet bits are combined within either weighted packet bits for the redundant packet or unweighted received bits for the redundant packet. The bits are combined by adding counterpart weighted (or weighted and unweighted) systematic and parity bit values within the two packets while inserting disjoint parity bit values within the combined result. Decoding performance for incremental redundancy systems utilizing turbo decoding is improved.

20 Claims, 2 Drawing Sheets

INCREMENTAL REDUNDANCY PACKET COMBINER AND DECODER

TECHNICAL FIELD OF THE INVENTION

The present invention is directed, in general, to wireless communications and, more specifically, to addressing multipath fading in wireless communications through incremental redundancy improving packet reception probability in wireless systems employing turbo-coding.

BACKGROUND OF THE INVENTION

In wireless channels, where signals can arrive at different times following different paths, the received signals can experience large amplitude and phase variations due to the interference of the different paths. This phenomena is referred to as multipath fading, and the effect is a critical parameter for consideration in receiver design. For terrestrial mobile telephony, multipath fading may dictate the entire system capacity and throughput rate.

Wireless signals transmitted from or to a mobile station may be reflected from the terrain, fixed or mobile objects in the propagation path such as buildings or vehicles, or from a discontinuity in the atmosphere. If the energy of the reflected wireless signal is not significantly absorbed and/or attenuated, a plurality of different propagation paths for the wireless signals are created between the transmitter and receiver, referred to as multipath propagation, which allows the wireless signals to "bend" around corners and propagate beyond terrain features and objects obstructing the line-of-sight between the base and remote stations.

Three problems associated with multipath propagation for remote stations include (1) the delay spread of the received signal, (2) the Rayleigh fading in received signal strength caused by varying phase shifts between different paths, and (3) the varying frequency modulation due to the Doppler shift between various propagation paths. The fact that propagation paths for reflected signals are longer than the direct propagation path from the transmitter to the receiver (e.g., from the base station to the remote station) gives rise to signal delays and, because various paths lead to slightly different arrival times, the received signal "spreads." Rayleigh fading results from differences between the phase and amplitude of the reflected wireless signals relative to the phase of a directly propagating signal, attenuating the signal strength at the receiving end (e.g., reception of two signals propagated along two different paths and arriving with a phase difference of 180 degrees results in cancellation in the receiver). Doppler shift is caused by the movement of the remote station—or a vehicle or other reflecting object—in relation to the base station, such that the mean frequencies of both the received reflected signal and of the directly propagated signal deviate from the mean frequency of the transmitted signal by a different amount and in a different direction.

In general, multipath fading causes wide variations in received signal amplitudes, and much effort has been expended in attempting to mitigate the impact of multipath fading. One suggestion for minimizing the effects of multipath fading, set forth in the High Data Rate (HDR) standard, involves transmitting redundant turbo-coded packets with new parity bits when an error occurs during decoding of the original packet at the receiver. Turbo-coding in communications systems involves coding/decoding information in stages in order to avoid retransmission of a full L-bit packet upon occurrence of a packet error. In addition to a set of code bits generated by an encoder using a turbo-coding scheme, a punctured set of code bits is typically generated and stored in transmitter memory. The original set of code bits is transmitted as an L-bit data packet to a receiver, which stores received data samples corresponding to the original set of code bits. The receiver decodes the data packet using a turbo-decoder and determines whether an error occurred in decoding the received data packet. If so, the received data samples are maintained in memory, and a request for more information is made. Some or all of the punctured information is then forwarded from the transmitter to the receiver. A second stage of turbo-decoding combines the new data samples with the stored original received data samples such that there is a high likelihood that decoding is correct at this point, but additional stages of decoding may be used.

In order to take advantage of the redundant packet transmission upon occurrence of decoding errors relating to turbo-coded packets, the remote receiver design must implement a suitable method for combining the decoded original packet or set of code bits and the second (punctured) packet or set of code bits. There is therefore a need in the art to improve decoding performance in incremental redundancy communications systems utilizing turbo-coding.

SUMMARY OF THE INVENTION

To address the above-discussed deficiencies of the prior art, it is a primary object of the present invention to provide, for use in an incremental redundancy wireless communications system, a mechanism for employing bit probability estimates generated by a turbo decoder to weight the bits of a received packet before combining the received packet with a redundant packet. Bits are individually weighted by the corresponding bit probability estimate and all bits within the received packet are weighted by a block confidence estimate generated from the cumulative bit probability estimates for the received packet. Weighted packet bits are combined within either weighted packet bits for the redundant packet or unweighted received bits for the redundant packet. The bits are combined by adding counterpart weighted (or weighted and unweighted) systematic and parity bit values within the two packets while inserting disjoint parity bit values within the combined result. Decoding performance for incremental redundancy systems utilizing turbo decoding is improved.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used below to describe the principles of the present invention are by way of illustration only and should not be construed in any way to limit the scope of the invention. Those skilled in the art will understand that the principles of the present invention may be implemented in any suitably arranged wireless communications system. Wireless communications system may conform with any of various known communications standards. For brevity, a complete description of the structure and operation of the wireless communications system will not be included herein, and only so much of the conventional wireless communications practices known in the art as are necessary for an understanding of the present invention are described.

Figure 1:
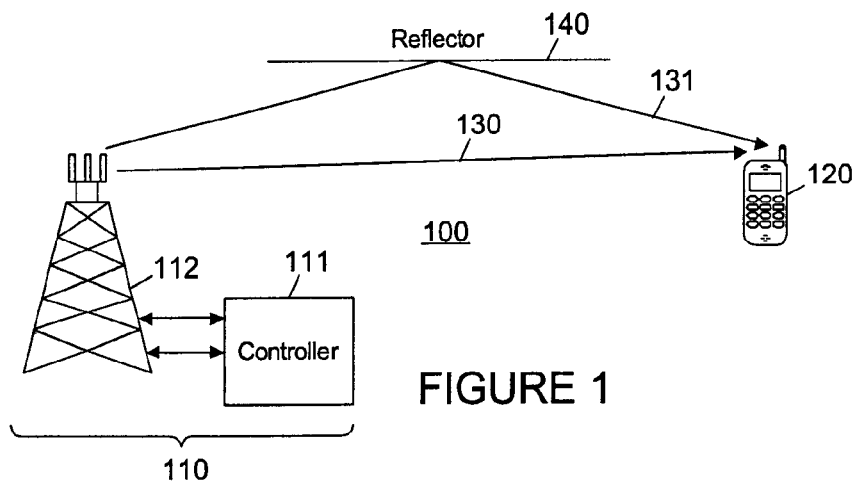
FIG. 1 illustrates a wireless communications system employing redundant packet combination utilizing extrinsic computations of a turbo decoder according to one embodiment of the present invention.

FIG. 1 illustrates a wireless communications system employing redundant packet combination utilizing extrinsic computations of a turbo decoder according to one embodiment of the present invention. Wireless communications system 100 includes a base station 110 and a remote station 120 which communicate via wireless signals, preferably employing the High Data Rate (HDR) standard, either alone or in combination with code division multiple access (CDMA). Although depicted in the exemplary embodiment as a mobile telephone, remote station 120 may be any wireless communication device.

Base station 110 includes a controller 111 and a transmission facility 112. Controller 111 employs turbo-encoding for transmitted signals. Turbo-encoding (also called "turbo-coding") refers to parallel concatenated (recursive systematic) convolutional coding, a form of forward error correction (FEC) coding in which an information sequence is encoded twice, with the second encoding being performed after (random or block) interleaving of the information sequence. Each recursive systematic convolutional (RSC) encoder within a turbo-encoding mechanism produces parity data from systematic or information data, where normally only the systematic data for one encoder and punctured (selected bits deleted) parity data from each encoder is all that is transmitted in order to improve code rate.

A direct propagation path 130 exists between base station 110 and remote station 120, and at least one reflector object 140 creates an indirect propagation path 131 between base station 110 and remote station 120. As a result of multi-path propagation between base station 110 and remote station 120, specific bits within systematic information decoded from the received signal may not accurately reflect the corresponding systematic information bits which were transmitted. Parity information accompanying the received systematic information may be employed to attempt to correct the decoding errors. However, an insufficient number of systematic information or parity bits may not be accurately received to allow accurate decoding of the received signal. Upon occurrence of a decoding error within remote station 120, remote station 120 requests additional information and a redundant packet is transmitted by base station 110. Base station 110 may transmit either a full packet or, to improve code rate, a punctured packet.

Decoding within remote station 120 is iterative. If the original received signals are not successfully decoded, the received redundant packet is combined with the original received signals for decoding. Additional stages may be required, with subsequent packets combined with the original and redundant received packets.

Although the exemplary embodiment describes the present invention in the context of transmissions from the base station 110 to the remote station 120, those skilled in the art will recognize that the present invention is equally applicable to transmissions from the remote station 120 to the base station 110.

Figure 2:
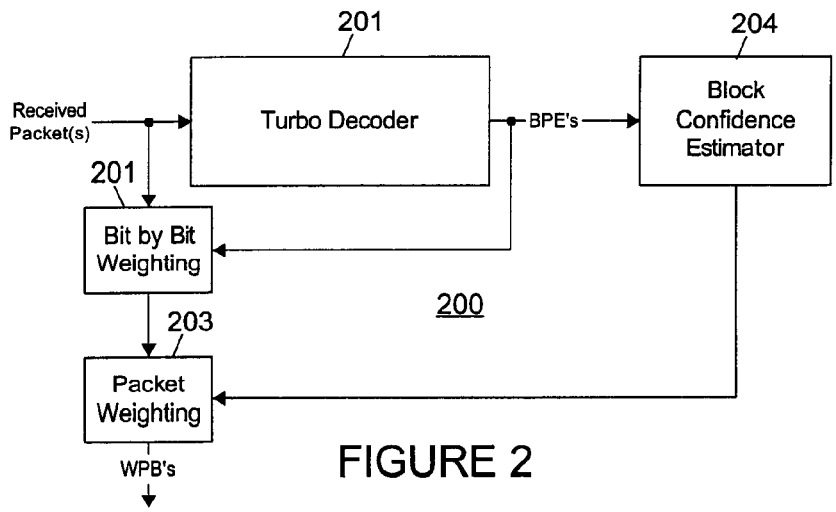
FIG. 2 illustrates in greater detail a first stage of an incremental packet combiner and decoder for redundant packet combination utilizing extrinsic computations of a turbo decoder according to one embodiment of the present invention.
Figure 3A:
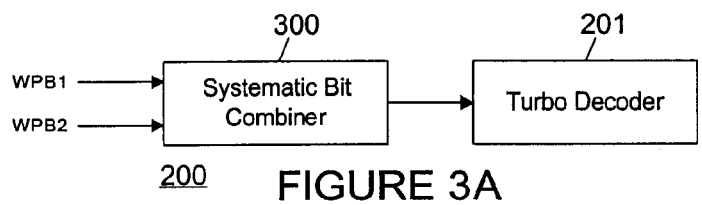
FIGS. 3A–3B illustrate a second stage of an incremental packet combiner and decoder for redundant packet combination utilizing extrinsic computations of a turbo decoder according to various embodiments of the present invention.
Figure 3B:
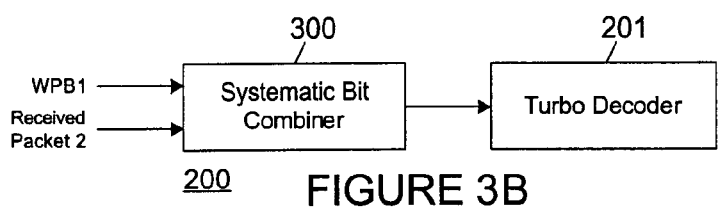

FIGS. 2 and 3A–3B illustrate in greater detail an incremental packet combiner and decoder for redundant packet combination utilizing extrinsic computations of a turbo decoder according to various embodiments of the present invention. FIG. 2 illustrates a first stage of an incremental packet combiner and decoder according to one embodiment of the present invention, implemented within a wireless signal receiver within either base station 110 or remote station 120 depicted in FIG. 1.

Incremental packer combiner and decoder 200 includes a first turbo decoder 201 to which each received packet is initially routed for decoding. Turbo decoders may be employs to make bit probability estimates (BPE's)—that is, compute an estimate of the probability of a given bit being either a logical 0 or a logical 1. This information is readily available in most conventional turbo decoder designs as, for example, either extrinsic information or a full a posteriori estimate including the extrinsic information. The bit probability estimates, typically ignored or used for purposes other than packet combination in conventional turbo-decoders, are employed in the present invention to improve correct packet reception probability.

Bit probability estimates generated by turbo decoder 201 are passed to a bit-wise weighting unit 202, which also receives the received packet bits and utilizes the bit probability estimates to weight the received systematic data bits. For example, a simple multiplication circuit may perform this weighting. The bit-wise weighted received signal bits are then passed to packet weighting unit 203.

Bit probability estimates generated by turbo decoder 201 are also passed to block confidence estimator 204, which computes a confidence estimate for the complete received packet by, for example, multiplying the total set of bit probability estimates. The bit-wise weighted packet generated by bit by bit weighting unit 202 is weighted within packet weighting unit 203 by the block confidence estimator 204 (e.g., by multiplying each individual bit by the block confidence estimate weight), forming a set of weighted packet bits (WPB's) for the first received packet. The weighted packet bits are employed, if necessary, in combining systematic information from multiple packets. Incremental packer combiner and decoder 200 may either compute the bit probability estimates and weighted packet bits only if a decoding error occurs, or may alternatively compute the bit probability estimates and weighted packet bits for each packet received and discard the information if no decoding error occurs.

FIGS. 3A–3B illustrate a second stage of an incremental packet combiner and decoder for redundant packet combination utilizing extrinsic computations of a turbo decoder according to various embodiments of the present invention. If a decoding error occurs during decoding of systematic information from a first packet and a second packet is requested and received, the weighted packet bits are employed to combine systematic information from the two packets. In the embodiment illustrated in FIG. 3A, the systematic information bits of the second packet are also weighted utilizing bit probability estimates from turbo decoder 201 and block confidence estimates from block confidence estimator 204. The weight packet bits for the first packet (WPB1) and the weighted packet bits for the second packet (WPB2) are then combined by, for example, adding the corresponding systematic weighted packet bits for both packets and any common parity weighted packet bits while correctly inserting any disjoint parity weighted packet bits. The resulting combined weight packet bits are then processed by turbo decoder 201 for decoding. Since the received bits of both packets are weighted, the embodiment of FIG. 3A performs "symmetric" weighted packet decoding.

An alternative to the embodiment of FIG. 3A which reduces computational complexity or computation time is to compute weighted packet bits only for the first (erroneously decoded) packet, and combined the weighted packet bits with the systematic information bits as received within the second packet, without rescaling or weighting the bits of the second packet, as shown in FIG. 3B.

Figure 4:
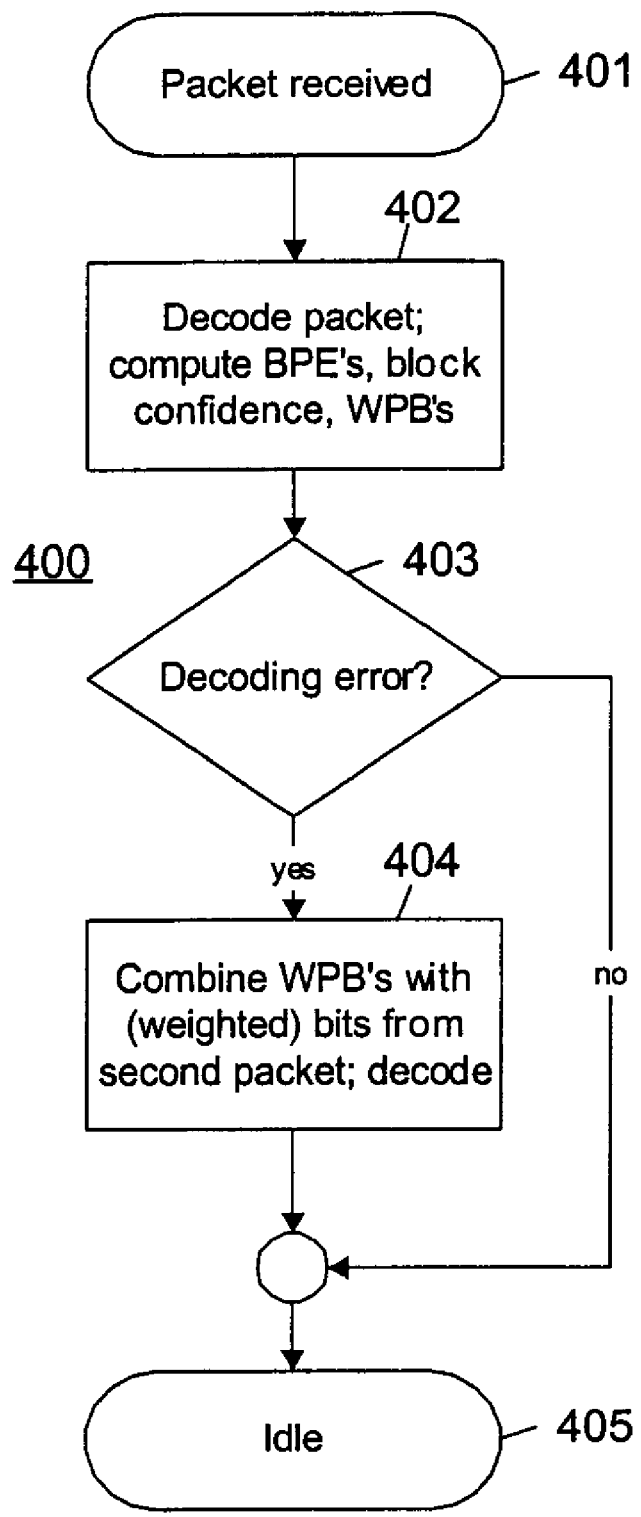
FIG. 4 is a flow diagram illustrating the operation of the exemplary turbo-coding with transmit diversity according to one embodiment of the present invention.

FIG. 4 is a flow diagram illustrating the operation of the exemplary turbo-coding with transmit diversity according to one embodiment of the present invention. The process 400, implemented by the incremental packer combiner and decoder 200 depicted in FIGS. 2 and 3A–3B, begins with receipt of a packet (step 401). The packet is first decoded (step 402) utilizing a turbo decoder which generates bit probability estimates for each received bit (systematic or parity), then a block confidence estimate is calculated based on the cumulative bit probability estimates and employed to generate weighted packet bits for the first packet.

A determination is then made (step 403) of whether decoding was successful (i.e., whether a decoding error occurred). If a decoding error occurred, the weighted packet bits for the first packet are combined with bit (either weighted or non-weighted) for the second packet (Step 404), with the combined result being decoded by a turbo decoder. If decoding is still not successful the process may be repeated, with weighted packet bits for decoding of the combined result being computed and combined with bits from a third packet. The process then becomes idle (step 405) until bits for another packet are received.

The present invention employs bit probability estimates generated while turbo decoding a received packet to weight packet bits which are combined with bits from a subsequent packet. Decoding performance in incremental redundancy systems is thereby improved.

It is important to note that while the present invention has been described in the context of a fully functional wireless communications system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

Although the present invention has been described in detail, those skilled in the art should understand that they can make various changes, substitutions and alterations herein without departing from the spirit and scope of the invention in its broadest form.

What is claimed is:

1. For use in an incremental redundancy wireless communications system, a system for combining and decoding packets comprising:
   an input receiving a packet;
   a turbo decoder coupled to said input and generating bit probability estimates for bits within said packet; and
   a weighting unit receiving said bit probability estimates from said turbo decoder and weighting each individual received bit within said packet utilizing a corresponding bit probability estimate.

2. The system for combining and decoding packets as set forth in claim 1 further comprising:
   a block confidence estimator receiving said bit probability estimates from said turbo decoder and generating a block confidence estimate for said.packet from said bit probability estimates.

3. The system for combining and decoding packets as set forth in claim 2 wherein said block confidence estimator generates said block confidence estimate by multiplying all bit probability estimates received from said turbo decoder for said packet.

4. The system for combining and decoding packets as set forth in claim 2 further comprising:
   a packet weighting unit receiving said block confidence estimate from said block confidence estimator and weighting every received bit within said packet utilizing said block confidence estimate to generate weighted packet bits for said packet.

5. The system for combining and decoding packets as set forth in claim 4 further comprising:
   a packet combiner combining said weighted packet bits for said packet with bits for a second packet received at said input and redundant to said packet.

6. The system for combining and decoding packets as set forth in claim 5 wherein said packet combiner combines said weighted packet bits for said packet with weighted packet bits for said second received packet.

7. The system for combining and decoding packets as set forth in claim 5 wherein said packet combiner combines said weighted packet bits for said packet with non-weighted received bits for said second received packet.

8. The system for combining and decoding packets as set forth in claim 5 wherein said packet combiner adds systematic and parity bit values within said weighted packet bits for said packet to corresponding systematic and parity bit values for said bits for said second packet while inserting disjoint parity bit values within either said weighted packet bits for said packet or said bits for said second packet to produce a combined packet result.

9. The system for combining and decoding packets as set forth in claim 5 wherein said turbo decoder receives and decodes a combined packet result produced by said packet combiner.

10. The system for combining and decoding packets as set forth in claim 1 wherein said turbo decoder generates said bit probability estimates while decoding said packet.

11. For use in an increment redundancy wireless communications system, a method of combining and decoding packets comprising the steps of:

receiving a packet;

generating bit probability estimates for bits within the packet utilizing a turbo decoder; and weighting each individual received bit within the packet utilizing a corresponding bit probability estimate.

12. The method as set forth in claim 11 further comprising:

generating a block confidence estimate for the packet from the bit probability estimates.

13. The method as set forth in claim 12 wherein the step of generating a block confidence estimate for the packet from the bit probability estimates further comprises:

multiplying all bit probability estimates for the packet.

14. The method as set forth in claim 12 further comprising:

every received bit within the packet utilizing the block confidence estimate to generate weighted packet bits for the packet.

15. The method as set forth in claim 14 further comprising:

combining the weighted packet bits for the packet with bits for a second packet redundant to the packet.

16. The method as set forth in claim 15 wherein the step of combining the weighted packet bits for the packet with bits for a second packet redundant to the packet further comprises:

combining the weighted packet bits for the packet with weighted packet bits for the second received packet.

17. The method as set forth in claim 15 wherein the step of combining the weighted packet bits for the packet with bits for a second packet redundant to the packet further comprises:

combining the weighted packet bits for the packet with non-weighted received bits for the second received packet.

18. The method as set forth in claim 15 wherein the step of combining the weighted packet bits for the packet with bits for a second packet redundant to the packet further comprises:

adding systematic and parity bit values within the weighted packet bits for the packet to corresponding systematic and parity bit values for the bits for the second packet; and inserting disjoint parity bit values within either the weighted packet bits for the packet or the bits for the second packet to produce a combined packet result.

19. The method as set forth in claim 15 further comprising:

decodes a combined packet result produced by the packet combiner utilizing the turbo decoder.

20. The method as set forth in claim 11 wherein the step of generating bit probability estimates for bits within the packet utilizing a turbo decoder further comprises:

generating the bit probability estimates while decoding the packet.

* * * * *